(12) United States Patent
Gasa et al.

(10) Patent No.: US 10,968,367 B2
(45) Date of Patent: Apr. 6, 2021

(54) LOW TEMPERATURE CURABLE ADHESIVE COMPOSITION AND ARTICLES INCLUDING THE SAME

(71) Applicant: H.B. Fuller Company, St. Paul, MN (US)

(72) Inventors: Jeffrey V. Gasa, Lawrenceville, GA (US); Praveen K. Balasubramani, Norcross, GA (US)

(73) Assignee: H.B. Fuller Company, St. Paul, MN (US)

(*) Notice: Subject to any disclaimer, the term of this patent is extended or adjusted under 35 U.S.C. 154(b) by 173 days.

(21) Appl. No.: 16/346,396

(22) PCT Filed: Nov. 8, 2017

(86) PCT No.: PCT/US2017/060641
§ 371 (c)(1),
(2) Date: Apr. 30, 2019

(87) PCT Pub. No.: WO2018/089494
PCT Pub. Date: May 17, 2018

(65) Prior Publication Data
US 2020/0181456 A1 Jun. 11, 2020

Related U.S. Application Data

(60) Provisional application No. 62/419,155, filed on Nov. 8, 2016.

(51) Int. Cl.
| | | |
|---|---|---|
| *C09J 4/06* | (2006.01) | |
| *C09J 7/35* | (2018.01) | |
| *C08K 3/013* | (2018.01) | |
| *C08F 220/28* | (2006.01) | |

(Continued)

(52) U.S. Cl.
CPC .......... *C09J 4/06* (2013.01); *C08F 220/1811* (2020.02); *C08F 220/281* (2020.02);
(Continued)

(58) Field of Classification Search
CPC ... C09J 7/35; C08K 3/013; C08K 3/04; C08K 3/36; C08K 5/5397; C08F 220/281; C08F 220/1811; C08F 222/1061; C08F 236/22
See application file for complete search history.

(56) References Cited

U.S. PATENT DOCUMENTS

| | | |
|---|---|---|
| 3,425,988 A | 2/1969 | Gorman |
| 4,309,526 A | 1/1982 | Baccei |

(Continued)

FOREIGN PATENT DOCUMENTS

| | | |
|---|---|---|
| EP | 0694569 A2 | 1/1996 |
| JP | H04279688 | 10/1992 |
| WO | WO 97/23524 A1 | 7/1997 |
| WO | WO2011/119828 | 9/2011 |
| WO | WO 2011/136015 | 11/2011 |

*Primary Examiner* — Daniel McNally
(74) *Attorney, Agent, or Firm* — Kirsten Stone; Allison Johnson

(57) ABSTRACT

A one part curable adhesive composition that includes a multifunctional (meth)acrylate oligomer the homopolymer of which has a glass transition temperature (Tg) of at least 100° C., and a first (meth)acrylate monomer exhibiting a viscosity of no greater than 1000 centipoise (cP) at 25° C., the first (meth)acrylate monomer being at least one of a (meth)acrylate monomer whose homopolymer has a Tg of at least 100° C. and (alkoxy) tetrahydrofurfuryl (meth)acrylate, the curable adhesive composition exhibiting a viscosity of no greater than 100,000 cP when measured at 25° C. and a shear rate of 20 sec$^{-1}$.

20 Claims, 4 Drawing Sheets

(51) Int. Cl.
  *C08F 222/10* (2006.01)
  *C08F 220/18* (2006.01)
  *C08F 236/22* (2006.01)
  *C08K 3/04* (2006.01)
  *C08K 3/36* (2006.01)
  *C08K 5/5397* (2006.01)

(52) U.S. Cl.
  CPC ...... *C08F 222/1061* (2020.02); *C08F 236/22* (2013.01); *C08K 3/013* (2018.01); *C08K 3/04* (2013.01); *C08K 3/36* (2013.01); *C08K 5/5397* (2013.01); *C09J 7/35* (2018.01); *C08K 2201/001* (2013.01); *C09J 2203/326* (2013.01); *C09J 2301/416* (2020.08)

(56) References Cited

U.S. PATENT DOCUMENTS

| | | |
|---|---|---|
| 7,875,688 B2 | 1/2011 | Dershem et al. |
| 7,928,153 B2 | 4/2011 | Dershem et al. |
| 8,378,017 B2 | 2/2013 | Dershem et al. |
| 8,613,623 B2 | 12/2013 | Sato |
| 8,715,833 B2 | 5/2014 | Yamada et al. |
| 8,907,049 B2 | 12/2014 | Baidak et al. |
| 9,267,054 B2 | 2/2016 | Wegner et al. |
| 9,371,470 B2 | 6/2016 | Barnes et al. |
| 9,403,990 B2 | 8/2016 | Takashima et al. |
| 9,437,346 B2 | 9/2016 | Shin et al. |
| 2005/0004304 A1 | 1/2005 | De Cooman et al. |
| 2013/0011683 A1* | 1/2013 | Busman .............. C09D 133/04 428/423.1 |

* cited by examiner

LOW TEMPERATURE CURABLE ADHESIVE COMPOSITION AND ARTICLES INCLUDING THE SAME

BACKGROUND

The invention is directed to formulating low temperature curable adhesive compositions that exhibit relatively high glass transition temperatures.

A variety of adhesive compositions are used as structural adhesives in electronic devices. However, it is often difficult to form a good adhesive bond to the types of substrates that are present in electronic devices. Such substrates include polycarbonate, alumina, metal and glass. In addition, many adhesive compositions must be heated to elevated temperatures to form good adhesive bonds. Many components in electronic devices are sensitive to heat and heating such components might cause the components to soften or melt or might impair or destroy the functionality of the component.

Thermally reactive adhesive compositions that are cured at low temperatures often exhibit low glass transition temperatures (Tgs). Adhesives that exhibit relatively low Tgs tend to exhibit poor performance reliability when used as structural adhesives. Adhesives that exhibit relatively high Tgs tend to exhibit good performance reliability when used as structural adhesives. To obtain a cured composition that exhibits a high Tg using a thermally reactive adhesive composition, it is often necessary to initiate the cure at a high temperature. Such temperatures often exceed 100° C. Curing an adhesive composition at a temperature greater than 100° C. while it is present in an electronic device might melt a component of the device or destroy the functionality of the device. Therefore, there is a need for a thermally curable adhesive composition that can be cured at a relatively low temperature, exhibit a relatively high Tg, and form good adhesive bonds to substrates such as polycarbonate, alumina, glass, and metal.

SUMMARY

In one aspect, the invention features a one part curable adhesive composition that includes at least 10% by weight, based on the total weight of polymerizable components, of a multifunctional (meth)acrylate oligomer the homopolymer of which has a glass transition temperature (Tg) of at least 100° C., and at least 4% by weight, based on the total weight of polymerizable components, of a first (meth)acrylate monomer exhibiting a viscosity of no greater than 1000 centipoise (cP) at 25° C., the first (meth)acrylate monomer being at least one of a (meth)acrylate monomer the homopolymer of which has a Tg of at least 100° C. and an (alkoxy) tetrahydrofurfuryl (meth)acrylate monomer, the curable adhesive composition exhibiting a viscosity of no greater than 100,000 cP when measured at 25° C. and a shear rate of 20 sec$^{-1}$. In one embodiment, the curable adhesive composition includes at least 5% by weight, based on the total weight of polymerizable components, of the first (meth)acrylate monomer.

In other embodiments, the curable adhesive composition includes at least 5% by weight, based on the total weight of polymerizable components, of the first (meth)acrylate monomer whose homopolymer has a Tg of at least 100° C., and the adhesive composition, when cured, exhibits a Tg of at least 120° C. In another embodiment, the composition, when cured, exhibits a Tg of at least 150° C. In other embodiments, the composition, when cured at a temperature of no greater than 60° C., exhibits a Tg of at least 150° C.

In some embodiments, the curable adhesive composition includes at least 20% by weight, based on the total weight of polymerizable components, of the multifunctional (meth)acrylate oligomer. In other embodiments, the curable adhesive composition includes at least 30% by weight, based on the total weight of polymerizable components, of the multifunctional (meth)acrylate oligomer. In some embodiments, the curable adhesive composition includes at least 40% by weight, based on the total weight of polymerizable components, of the multifunctional (meth)acrylate oligomer.

In other embodiments, the curable adhesive composition includes at from about 4% by weight to about 25% by weight alkoxylated tetrahydrofurfuryl (meth)acrylate based on the total weight of polymerizable components. In some embodiments, the curable adhesive composition includes at least 10% by weight, based on the total weight of polymerizable components, alkoxylated tetrahydrofurfuryl (meth)acrylate.

In another embodiment, the composition, when cured, exhibits a Tg of at least 85° C. In other embodiments, the composition, when cured at a temperature of no greater than 70° C., exhibits a Tg of at least 85° C.

In one embodiment, the curable composition further includes at least 30% by weight of a nonconductive filler. In some embodiments, the curable adhesive composition further includes from about 30% by weight to about 90% by weight filler. In other embodiments, the filler includes fumed silica, fused silica or a combination thereof.

In other embodiments, the curable adhesive composition, when cured, exhibits a coefficient of thermal expansion of no greater than 75 parts per million per degree centigrade (ppm/° C.).

In some embodiments, the curable adhesive composition includes at least 17% by weight or even at least 30% by weight, based on the total weight of polymerizable components, of the multifunctional (meth)acrylate oligomer, and at least 10% by weight, based on the total weight of polymerizable components, of the first (meth)acrylate monomer.

In other embodiments, the curable adhesive composition includes at least 20% by weight, based on the total weight of polymerizable components, of the multifunctional (meth)acrylate oligomer, and from at least 10% by weight, based on the total weight of polymerizable components, to no greater than 55% by weight or even no greater than 45% by weight, based on the total weight of polymerizable components, of the first (meth)acrylate monomer.

In some embodiments, the curable adhesive composition further includes a thermal initiator, a photo initiator, or a combination thereof.

In other embodiments, the homopolymer of the multifunctional (meth)acrylate oligomer exhibits a glass transition temperature of at least 120° C. In one embodiment, the homopolymer of the multifunctional (meth)acrylate oligomer exhibits a glass transition temperature of at least 140° C.

In another embodiment, the curable adhesive composition further includes a monoethylenically unsaturated (meth)acrylate monomer exhibiting a viscosity of no greater than 100 centipoise (cP) at 25° C. In other embodiments, the curable adhesive composition includes at least 5% by weight of the monoethylenically unsaturated (meth)acrylate monomer.

In one embodiment, the curable adhesive composition further includes tetrahydrofurfuryl acrylate, alkoxy tetrahydrofurfuryl acrylate, or a combination thereof. In another embodiment, the curable adhesive composition includes at least 2% by weight of tetrahydrofurfuryl acrylate, alkoxy tetrahydrofurfuryl acrylate, or a combination thereof. In some embodiments, the curable adhesive composition further includes tetrahydrofurfuryl acrylate, alkoxy tetrahydrofurfuryl acrylate, or a combination thereof, and a second (meth)acrylate monomer different from the first (meth) acrylate monomer, the second (meth)acrylate monomer being multifunctional and including polyester (meth)acrylate.

In another embodiment, the homopolymer of the second (meth)acrylate monomer exhibits a Tg of at least 200° C.

In other embodiments, the curable adhesive composition further includes a second (meth)acrylate monomer the homopolymer of which exhibits a Tg of at least 200° C., the second (meth)acrylate monomer being multifunctional and being different from the first (meth)acrylate monomer. In some embodiments, the second (meth)acrylate monomer includes at least three ethylenically unsaturated functional groups.

In another aspect, the invention features an electronic article that includes a first substrate, an adhesive composition, and a component adhered to the first substrate through the adhesive composition, the adhesive composition including a cured form of the curable adhesive composition disclosed herein. In other embodiments, the first substrate includes polycarbonate, alumina, glass, metal, or a combination thereof.

In other aspects, the invention features a method of using a one part adhesive composition, the method including heating a one part thermally curable adhesive composition disclosed herein to a temperature of no greater than 80° C. to form a cured composition having a Tg greater than 85° C., or even greater than 100° C. In one embodiment, the heating includes heating the thermally curable adhesive composition to a temperature of no greater than 70° C. In other embodiments, the heating includes heating the thermally curable adhesive composition to a temperature of no greater than 60° C. In some embodiments, the heating includes heating the curable adhesive composition to form a cured adhesive composition that exhibits a Tg of at least 120° C. In another embodiment, the heating includes heating the curable adhesive composition to form a cured adhesive composition that exhibits a Tg of at least 140° C.

In some embodiments, the method further includes exposing the thermally curable adhesive composition to electron radiation, ultraviolet radiation, visible light, or a combination thereof.

In one embodiment, the method includes applying a one part curable adhesive composition disclosed herein to a component of an article (e.g., an electronic article), exposing the adhesive composition to visible light, electron beam radiation, ultraviolet radiation, or a combination thereof, heating the adhesive composition to a temperature of no greater than 80° C., and allowing the heated composition to cure, the cured composition exhibiting a Tg greater than 85° C. or even greater than 100° C.

In another aspect, the invention features a one part curable adhesive composition that includes at least 10% by weight, based on the total weight of polymerizable components, of a multifunctional (meth)acrylate oligomer the homopolymer of which has a glass transition temperature (Tg) of at least 100° C., at least 5% by weight, based on the total weight of polymerizable components, of a first (meth)acrylate monomer the homopolymer of which has a Tg of at least 100° C., the first (meth)acrylate monomer exhibiting a viscosity of no greater than 1000 centipoise (cP) at 25° C., and a second (meth)acrylate monomer the homopolymer of which has a Tg of at least 200° C., the second (meth)acrylate monomer being multifunctional, the curable adhesive composition exhibiting a viscosity of no greater than 100,000 cP when measured at 25° C. and a shear rate of 20 $\sec^{-1}$.

In other aspects, the invention features a one part curable adhesive composition that includes at least about 30% by weight, based on the total weight of polymerizable components, of a multifunctional (meth)acrylate oligomer the homopolymer of which has a glass transition temperature (Tg) of at least 100° C., and from 5% by weight to no greater than 25% by weight, based on the total weight of polymerizable components, (alkoxy) tetrahydrofurfuryl (meth)acrylate, the curable adhesive composition exhibiting a viscosity of no greater than 100,000 cP when measured at 25° C. and a shear rate of 20 $\sec^{-1}$.

The invention features an adhesive composition that can be cured at a relatively low temperature to form a thermoset adhesive composition that exhibits a relatively high glass transition temperature.

The invention also features a thermoset adhesive composition that exhibits good adhesion to at least one of glass, polycarbonate, metal, and alumina.

Other features and advantages will be apparent from the Figures, the following description of the preferred embodiments, and the claims.

GLOSSARY

Figure 1:
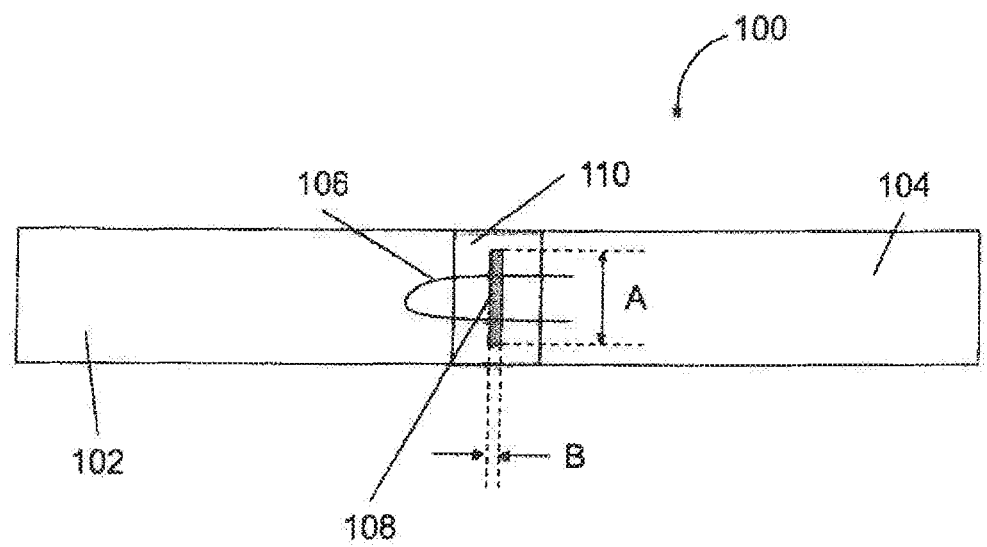
FIG. 1 is an illustration of a test sample prepared according to the Test Sample Preparation Method.

In reference to the invention, the following terms have the meanings set forth below:

As used herein, the term "(meth)acrylate." is a shorthand reference meaning acrylate, methacrylate, or a combination thereof.

As used herein, the term "multifunctional (meth)acrylate" means a (meth)acrylate that includes at least two (meth) acrylate groups.

As used herein, the term "(alkoxy) tetrahydrofurfuryl (meth)acrylate" is a shorthand reference meaning alkoxylated tetrahydrofurfuryl (meth)acrylate, tetrahydrofurfuryl (meth)acrylate, or a combination thereof.

DETAILED DESCRIPTION

One Part Adhesive Composition

The one part curable adhesive composition includes a multifunctional (meth)acrylate oligomer the homopolymer of which has a glass transition temperature (Tg) of at least 100° C., and a first (meth)acrylate monomer exhibiting a viscosity of no greater than 1000 centipoise (cP) at 25° C. and being at least one of a (meth)acrylate monomer that exhibits a Tg of at least 100° C., and (alkoxy) tetrahydrofurfuryl (meth)acrylate. The adhesive composition, when cured, exhibits a Tg of at least about 85° C., at least about 90° C., at least about 100° C., at least about 115° C., at least about 120° C., at least about 140° C., or even at least about 150° C.

The curable adhesive composition exhibits a viscosity of no greater than 100,000 cP, no greater than 50,000 cP, no greater than about 25,000 cP, from about 1,000 cP to about 50,000 cP, or even from about 10,000 cP to about 50,000 cP when measured at 25° C. and a shear rate of 20 sec$^{-1}$.

The curable adhesive composition preferably is stored at a temperature of no greater than −40° C., no greater than −20° C., or even no greater than 0° C. after having been formulated and prior to use. The curable adhesive composition also has a useful work life of at least about 8 hours at 25° C., and preferably exhibits no greater than a 25% increase in viscosity when held at 25° C. for no greater than 8 hours.

The curable adhesive composition can be formulated to exhibit a desired thixotropic index including, e.g., a thixotropic index of no greater than 10, no greater than 5, no greater than 2, from about 4 to about 10, or even from about 5 to about 10.

The curable adhesive composition can be cured at a temperature no greater than 80° C., no greater than 70° C., or even no greater than 60° C. The composition can be cured through a variety of free radical generating processes including, e.g., exposing the composition to heat (e.g., heating the composition), actinic radiation (e.g., ultraviolet light radiation, visible light radiation, and combinations thereof), electron beam radiation, microwave radiation, and combinations thereof. Where the process used to cure the composition includes heating the composition, the curable adhesive composition additionally includes a thermal initiator. Where the process used to cure the composition includes exposing the composition to ultraviolet or visible light radiation, the curable adhesive composition additionally includes a photo initiator. The curable adhesive composition optionally includes both a thermal initiator and a photo initiator.

The cured adhesive composition exhibits a good adhesive bond to a variety of substrates and preferably exhibits an adhesive strength of at least 4 megapascal (MPa), at least 6 MPa, at least 8 MPa, or even at least 10 MPa to at least One of polycarbonate, alumina, glass, and metal when tested according to the Shear Strength Test Method.

The curable adhesive composition preferably exhibits a die shear strength of at least 5 MPa, at least 10 MPa, or even at least 20 MPa to polycarbonate when tested according to the Die Shear Strength Test Method using polycarbonate, alumina, or metal dies.

The cured adhesive composition preferably exhibits a coefficient of thermal expansion of no greater than 75 parts per million per degree centigrade (ppm/° C.), no greater than 60 ppm/° C., or even no greater than 50 ppm/° C. when tested below the glass transition temperature of the adhesive composition and a coefficient of thermal expansion of no greater than 170 ppm/° C., no greater than 160 ppm/° C., no greater than 150 ppm/° C., or even no greater than 130 ppm/° C. when tested above the glass transition temperature of the adhesive composition.

The adhesive composition preferably exhibits no greater than 2%, no greater than 1%, or even no greater than 0.5% linear shrinkage.

Multifunctional (Meth)Acrylate Oligomer

The multifunctional (meth)acrylate oligomer includes at least two ethylenically unsaturated functional groups and exhibits a Tg of at least 100° C., at least 115° C., at least 120° C. at least 140° C., at least 150° C., or even at least 160° C. Preferably at least two of the ethylenically unsaturated functional groups are located at the terminal ends of the multifunctional (meth)acrylate oligomer.

Useful classes of (meth)acrylate oligomers include, e.g., oligomers that include at least one acrylate group and at least one methacrylate group, oligomers that include dicyclopentadienyl, phenyl groups and ester groups along the backbone of the oligomer, and oligomers that include combinations of the aforementioned groups. Useful multifunctional (meth) acrylate oligomers are also described in U.S. Pat. No. 7,875,688 (e.g., the compound of Example 2 disclosed therein) and incorporated herein.

Suitable multifunctional (meth)acrylate oligomers are available from Designer Molecules, Inc. (San Diego, Calif.), one example of which is PEAM 645 (meth)acrylate oligomer, which includes both acrylate and methacrylate groups linked together by a polyester group.

The curable adhesive composition includes at least 10% by weight, at least 15% by weight, at least about 20% by weight, at least about 30% by weight, at least about 40% by weight, no greater than about 85% by weight, no greater than about 80% by weight, from about 20% by weight to about 85% by weight, from about 30% by weight to about 85% by weight, from about 30% by weight to about 80% by weight, or even from about 30% by weight to about 65% by weight multifunctional (meth)acrylate oligomer based on the weight of the polymerizable components in the adhesive composition.

First (Meth)Acrylate Monomer

The first (meth)acrylate monomer can be multifunctional or monofunctional. The first (meth)acrylate monomer includes at least one ethylenically unsaturated functional group, or even at least two ethylenically unsaturated functional groups. The first (meth)acrylate monomer also exhibits a viscosity of no greater than 1000 cP, no greater than 500 cP, or even no greater than 150 cP at 25° C.

One useful class of first (meth)acrylate monomers includes (meth)acrylate monomers whose homopolymer has a Tg of at least 100° C., at least 110° C., at least 115° C., at least 120° C. at least 140° C., at least 150° C., or even at least 160° C. Multifunctional (meth)acrylate monomers suitable for use as the first (meth)acrylate monomer whose homopolymer has a Tg of at least 100° C. include (meth)acrylate monomers that include, e.g., monocyclic and condensed alicyclic hydrocarbon groups (e.g., a five membered ring, a six membered ring, and a condensed ring of five and six membered rings (e.g., cyclohexane, norbornane, and tricyclodecane)) and at least two polymerizable groups (e.g., (meth)acryloloxy groups) including, e.g., tricyclodecane dimethanol diacrylate, tricyclodecane dimethanol dimethacrylate, cyclohexanedimethanol di(meth)acrylate, 1,4-cyclohexane dimethanol dimethacrylate, and combinations thereof.

Multifunctional (meth)acrylate monomers suitable for use as the first (meth)acrylate monomer whose homopolymer has a Tg of at least 100° C. are commercially available under a variety of trade designations including, e.g., under the SARTOMER series of trade designations from Arkema Inc. (Exton, Pa.) including SARTOMER SR833S tricyclodecane dimethanol diacrylate.

One useful class of monofunctional (meth)acrylate monomers suitable for use as the first (meth)acrylate monomer whose homopolymer has a Tg of at least 100° C. includes monofunctional (meth)acrylate monomers that have multiple cyclic groups, suitable examples of which include isobornyl (meth)acrylate, adamantyl (meth)acrylate, dicyclopentadienyl (meth)acrylate, and combinations thereof. Suitable monofunctional (meth)acrylate monomers are commercially available under the SARTOMER series of trade designations from Arkema Inc. including SARTOMER SR423A isobornyl methacrylate.

The curable adhesive composition includes at least about 5% by weight, at least about 10% by weight, at least about 17% by weight, at least about 20% by weight, at least about 30% by weight, at least about 40% by weight, no greater than 60% by weight, no greater than 50% by weight, from about 5% by weight to about 60% by weight, or even from about 10% by weight to about 45% by weight of a first (meth)acrylate monomer whose homopolymer has a Tg of at least 100° C., based on the weight of the polymerizable components in the adhesive composition.

Another useful class of (meth)acrylate monomers suitable for use as the first (meth)acrylate monomer includes alkoxylated tetrahydrofurfuryl (meth)acrylates, tetrahydrofurfuryl (meth)acrylate, and combinations thereof. Suitable commercially available (alkoxy) tetrahydrofurfuryl (meth)acrylates are available under a variety of trade designations including, e.g., the SARTOMER series of trade designations from Arkema Inc. (Exton, Pa.) including SR203 tetrahydrofurfuryl methacrylate, SR 285 tetrahydrofurfuryl acrylate, and SR611 alkoxylated tetrahydrofurfuryl acrylate. When the first (meth)acrylate monomer includes an (alkoxy) tetrahydrofurfuryl (meth)acrylate, the curable adhesive composition preferably includes at least 1% by weight, at least 5% by weight, no greater than 25% by weight, no greater than 22% by weight, no greater than 20% by weight, from about 4% by weight to about 25% by weight, or even from about 10% by weight to about 22% by weight, based on the weight of polymerizable components, (alkoxy) tetrahydrofurfuryl (meth)acrylate.

Free Radical Initiator

The adhesive composition optionally includes a free radical initiator. Useful free radical initiators include thermal free radical initiators, photo initiators, and mixtures thereof.

Useful thermal initiators have a ten hour half-life at a temperature of no greater than 70° C., no greater than 60° C., no greater than 50° C., no greater than 40° C., no greater than 30° C. or even from about 30° C. to about 70° C. Useful classes of thermal initiators include, e.g., organic peroxides (e.g., di(4-tert-butylcyclohexyl) peroxydicarbonate, tert-butyl peroxyneodecanoate, di(2-ethylhexyl)peroxydicarbonate), benzoyl peroxide, lauroyl peroxide, 2,2-azo-bi-sisobutyronitrile, t-butyl peroxypivalate, α,α'-Bis (neodecanoyl peroxy) diisopropyl benzene, cumyl peroxy neodecanoate, t-hexyl peroxypivalate, 1,1,3,3-tetramethyl-butyl peroxy neodecanoate, 1,1,3,3-tetramethylbutyl peroxy 2-ethylhexanoate, t-amyl peroxypivalate, t-amyl peroxy neodecanoate, isobutyryl peroxide, succinic peroxide, 3,5,5-trimethylhexanoyl peroxide, di-methoxybutyl peroxydicarbonate, di-(sec-butyl) peroxydicarbonate, t-butyl peroxyneoheptanoate, di-(3,5,5-trimethylhexanoyl) peroxide, di-(sec-butyl) peroxydicarbonate, and combinations thereof.

Suitable thermal initiators are commercially available under a variety of trade designations including, e.g., PERKADOX 16 di(4-tert-butylcyclohexyl) peroxydicarbonate and TRIGONOX 23 tert-butyl peroxyneodecanoate both of which are available from Akzo Nobel (Chicago, Ill.), PEROXAN EPC di(2-ethylhexyl)peroxydicarbonate) from Pergan Marshall LLC (Marshall, Tex.), under the VAZO series of trade designations from DowDuPont (Wilmington, Del.), and under the CHEMEX series of trade designations from (Hosting Chemex Co, Ltd. (Seoul, Korea) including CHEMEX 2EHPC, BND series, BPV series, CND70(IP), OND, TMPO, AND, and APV.

The curable adhesive composition includes from 0% by weight to no greater than 10% by weight, at least about 1% by weight, no greater than 5% by weight, no greater than 3% by weight, from about 1% by weight to about 5% by weight, or even from about 2% by weight to about 4.5% by weight thermal initiator.

Useful photo initiators include, 2-hydroxy-2-methyl-1-phenyl-propan-1-one, 2,2-dimethoxy-1,2-diphenylethan-1-one, 1-hydroxy cyclohexyl phenylketone, 2,4,6-trimethyl-benzoyl-diphenyl-phosphineoxide, benzophenone, benzoin, benzoin ethers (e.g., benzoin methyl ether and benzoin isopropyl ether), substituted benzoin ethers (e.g., anisoin methyl ether), substituted acetophenones (e.g., 2,2-di-ethoxyacetophenone and 2,2-dimethoxy-2-phenylacetophenone), substituted alpha-ketols (e.g., 2-methyl-2-hydroxy-propiophenone), aromatic sulfonyl chlorides (e.g., 2-naphthalenesulfonyl chloride), photoactive oximes (e.g., 1-phenyl-1,2-propanedione-2-(O-ethoxycarbonyl)oxime), and mixtures thereof.

Suitable photo initiators are commercially available under a variety of trade designations including, e.g., the OMNIRAD series of trade designations from IGM Resins USA Inc. (Charlotte, N.C.) including OMNIRAD 73 2-hydroxy-2-methyl-1-phenylpropanone and OMNIRAD 819 bis(2,4,6-trimethyibenzoyl)-phenyiphosphineoxide, the DAROCUR series of trade designations from BASF Corporation (Florham Park, N.J.) including DAROCUR TPO 2,4,6-trimethylbenzoyl-diphenyl-phosphineoxide, the IRGACURE series of trade designations from BASF Corporation including, e.g., IRGACURE 651, IRGACURE TPO 2,4,6-trimethylbenzoyl-diphenyl-phosphineoxide, IRGACURE TPO L liquid 2,4,6-trimethylbenzoyl phenylphosphinate, and IRGACURE 819 bis(2,4,6-trimethylbenzoyl)-phenylphosphineoxide, and the ESACURE series of trade designations from Lamberti SpA (Gallarate, Italy) including ESACURE KB-1 benzildimethylketal.

The curable adhesive composition includes from 0% by weight to no greater than 10% by weight, no greater than 5% by weight, no greater than 3% by weight, or even from about 0.2% by weight to about 5% by weight photo initiator.

Second (Meth)Acrylate Monomer

The curable adhesive composition optionally includes a second (meth)acrylate monomer. The second (meth)acrylate monomer is multifunctional and differs from the first (meth)acrylate monomer. The second (meth)acrylate monomer includes at least three ethylenically unsaturated functional groups. The homopolymer of the second (meth)acrylate monomer exhibits a Tg of at least 180° C., at least 200° C., at least 250° C., at least 275° C., or even at least 300° C., and a viscosity of at least 2000 cP, at least 4000 cP, or even at least 6000 cP at 25° C. Useful second (meth)acrylate monomers are commercially available under the ARONIX series of trade designations from Toagosei Co. Ltd. (Japan) and include ARONIX M-9050, M-309, M-313, M-315, M-305, M-306, M-450, M-451, M-400, M-402, M-403, M-404, M-405, M-406, M-408, M-7300K, M-8030, and M-8060, and under the SARTOMER series of trade designations from Arkema Inc. (Exton, Pa.) and include SARTOMER SR368 and SR228.

The curable adhesive composition includes from 0% by weight to no greater than about 25% by weight, from about 2% by weight to about 15% by weight, from about 2% by weight to about 10% by weight, or even from about 2% by weight to about 5% by weight second (meth)acrylate monomer, based on the weight of the polymerizable components in the adhesive composition.

Diluent

The curable adhesive composition optionally includes a diluent. Useful diluents include, e.g., reactive diluents, non-reactive diluents, and mixtures thereof. Useful reactive diluents include the monofunctional (meth)acrylate monomers set forth above, other ethylenically unsaturated monomers including, e.g., other monofunctional ethylenically unsaturated monomers, multifunctional monomers, and combinations thereof.

Suitable monofunctional monomers include, e.g., methyl (meth)acrylate, isopropyl (meth)acrylate, isobutyl (meth) acrylate, tert-butyl (meth)acrylate, steryl (meth)acrylate, 2-hexyl (meth)acrylate, octyl (meth)acrylate, isooctyl (meth)acrylate, decyl (meth)acrylate, isodecyl (meth)acrylate, dodecyl (meth)acrylate, tetradecyl(meth)acrylate, phenoxyethyl (meth)acrylate, tetrahydrofurfuryl (meth)acrylate, glycidyl (meth)acrylate, hydroxyethyl (meth)acrylate, hydroxypropyl (meth)acrylate, hydroxybutyl (meth)acrylate, benzyl (meth)acrylate, dicyclopentyl (meth)acrylate, and combinations thereof.

Suitable multifunctional monomers include, e.g., ethylene glycol di(meth)acrylate, diethylene glycol di(meth)acrylate, triethylene glycol di(meth)acrylate, dipropylene glycol di(meth)acrylate, 1,3-butylene glycol di(meth)acrylate, 1,4-butanediol di(meth)acrylate, 1,6-hexanediol di(meth)acrylate, neopentyl glycol di(meth)acrylate, cyclohexane dimethanol di(meth)acrylate, dicyclopentyl di(meth)acrylate, glyceryl tri(meth)acrylate, trimethylolpropane tri(meth) acrylate, pentaerythritol tri(meth)acrylate, pentaerythritol tetra(meth)acrylate, dipentaerythritol penta(meth)acrylate, tris(2-hydroxy ethyl)isocyanurate tri(meth)acrylate, alkoxylated versions of the same, metallic (meth)acrylates (e.g., (meth)acrylates of zinc, magnesium, and calcium), and combinations thereof.

Other suitable diluent monomers include, e.g., vinyl monomers, allylic monomers, and acrylamide monomers, useful examples of which include, e.g., styrene, vinyl toluene, methyl styrene, divinyl benzene, allyl methacrylate, allyl cinnamate, allyl glycidyl ether, acrylamide, methacrylamide, N-methylol acrylamide, N-methylol methacrylamide, and combinations thereof.

The adhesive composition includes from 0% by weight to about 25% by weight, from about 1% by weight to about 15% by weight, from about 1% by weight to about 10% by weight, or even from about 1% by weight to about 5% by weight diluent based on the total weight of the adhesive composition.

Additives

Various additives may be included in the adhesive composition including, e.g., adhesion promoters (e.g., silane adhesion promoters), antioxidants, rheology modifiers, fillers (e.g., nano-sized fillers (e.g., particles and fibers), inhibitors, pigments, toughening agents, flexibilizers, and combinations thereof.

Useful adhesion promoters include, e.g., silanes, isocyanate containing compounds, titanates, zirconates, phosphates, epoxy-containing compounds, epoxy(meth)acrylate hybrid monomers and oligomers, and combinations thereof. Examples of useful epoxy-containing compounds include (e silsesquioxane, epoxy silane, epoxy resins (e.g., Bisphenol A diglycidyl ether and Bisphenol F diglycidyl ether), epoxy phenolic novolac resins, epoxy cresol novolac resins, cycloaliphtic epoxies, and combinations thereof. Useful epoxy silane adhesion promoters are available under the SILQUEST series of trade designations from Momentive Performance Materials Inc. (Waterford, N.Y.) including SILQUEST A187 alkoxy silane epoxy adhesion promoter.

Useful fillers can be in a variety of shapes including, e.g., spherical, faceted, cylindrical, discoidal, tabular, ellipsoidal, and irregular, and a variety of forms including, e.g., particles, microspheres, and beads, and can includes mixtures thereof. Useful fillers include, e.g., electrically conductive fillers (e.g., electrically conductive particles), non-conductive fillers, thermally conductive fillers, rheology modifiers, and combinations thereof. Suitable electrically conductive particles include, e.g., carbon particles (e.g. carbon black, graphite, carbon nanotubes, carbon fibers, graphene, and combinations thereof), metal particles (e.g., particles of silver, copper, nickel, gold, tin, zinc, platinum, palladium, iron, tungsten, molybdenum, metal alloys, and combinations thereof), particles that include a surface coating of a conductive material (e.g., a metal, an alloy, and combinations thereof), and combinations thereof. The adhesive composition preferably includes from 0% by weight to no greater than about 95% by weight, at least about 25% by weight, at least about 30% by weight, from about 25% by weight to about 90% by weight, from about 40% by weight to about 90% by weight, or even from about 45% by weight to about 85% by weight conductive filler based on the total weight of the adhesive composition.

Useful non-conductive fillers include, e.g., fumed silica, fused silica, silica nanoparticles, polymer particles (e.g., polyethylene, polystyrene, phenol resin, epoxy resin, acryl resin, and benzoguanamine resin particles), glass beads, glass fibers, ceramic, and combinations thereof. The adhesive composition preferably includes from 0% by weight to about 70% by weight, at least 10% by weight, at least 15% by weight, at least about 25% by weight, at least about 30% by weight, from about 25% by weight to about 70% by weight, or even from about 30% by weight to about 70% by weight nonconductive filler based on the total weight of the adhesive composition.

Useful thermally conductive fillers include, e.g., graphite, aluminum nitride, silicon carbide, boron nitride, diamond dust, zinc oxide, alumina, and combinations thereof.

Useful rheology modifiers include, e.g., polysiloxanes (e.g., polydimethyl siloxanes), silica, fumed silica, fumed alumina, fumed titanium dioxide, calcium carbonate, talc, clay, and combinations thereof.

The toughing agent preferably increases the toughness (e.g., impact resistance and energy absorption) of the adhesive composition such that adhesive bonds formed by the adhesive composition exhibit improved reliability. When parts bonded together through an adhesive composition that includes a toughening agent are subjected to an impact force (e.g., are dropped), the adhesive bond preferably is maintained. Useful toughening agents include, e.g., core-shell polymers, telechelic synthetic rubber polymers (e.g., polybutadiene and butadiene-acrylonitrile copolymers) having carboxyl-, amino-, vinyl- (methacrylic-), or epoxy-functionality, or a combination of such functionalities. Examples of suitable commercially available toughening agents include, e.g., polymers available under the HYPRO series of trade designations from CVC Thermoset Specialties (Moorestown, N.J.) including HYPRO 200X168LC VTB methacrylate functional polybutadiene having a target viscosity of from about 60,000 cP to about 150,000 cP at 27° C. and a Tg of −80° C. (as reported by the manufacturer), HYPRO 1300X33LC VTBNX methacrylate functional butadiene-acrylonitrile copolymer having a Tg of −49° C. (as reported by the manufacturer), and HYPRO 1300X43LC VTBNX methacrylate functional butadiene-acrylonitrile copolymer having a Tg of −45° C. (as reported by the manufacturer), and ZEFIAC F351 core-shell butylacrylate-methacrylic acid-methylmethacrylate copolymer particles from AICA Kogyo Co., Ltd (Japan).

The toughening agent forms a minor separate phase in the adhesive composition. The adhesive composition preferably includes no greater than 10% by weight, from about 1% by weight to about 10% by weight, or even from about 3% by weight to about 10% by weight toughening agent.

Useful flexibilizing agents include, e.g., aliphatic urethane di(meth)acrylate oligomers having a modulus of no greater than about 0.5 (ligapascal (GPa). Useful commercially available flexibilizing agents include, e.g., aliphatic urethane di(meth)acrylate oligomers commercially available from Sartomer Arkema Group Inc. (Exton, Pa.) under the trade designations CN981 aliphatic polyester/polyether urethane diacrylate oligomer, CN991 aliphatic polyester-based urethane diacrylate oligomer, CN964 aliphatic polyester-based urethane diacrylate oligomer, CN965 aliphatic polyester-based urethane diacrylate oligomer, CN962 aliphatic polyester-based urethane diacrylate oligomer, CN9009 aliphatic urethane acrylate oligomer, CN9001 aliphatic urethane acrylate oligomer, and CN966J75 aliphatic polyester-based urethane diacrylate oligomer.

Use

The curable adhesive composition is useful in a variety of applications that include bonding at least two substrates. One useful method of using the curable adhesive composition includes applying the curable adhesive composition to a first substrate, contacting the adhesive composition with a second substrate to form an uncured assembly, and exposing the uncured assembly to at least one polymerization condition including, e.g., elevated temperature (i.e., heat), actinic radiation, electron beam radiation, and combinations thereof. For substrates that do not permit sufficient penetration by electron beam radiation, ultraviolet radiation, visible light, and combinations thereof, the adhesive composition preferably includes a thermal initiator and the polymerization is initiated by heat. Alternatively, polymerization is first initiated by exposing an exposed surface of the adhesive composition to ultraviolet, visible light, electron beam radiation, and combinations thereof, and then subsequently initiated by heating the composition to cure the portion of the adhesive composition that is not available for cure using visible light, ultraviolet radiation, or electron beam radiation.

Articles

The curable adhesive composition is useful in a variety of articles including, e.g., electronic articles. The article includes a first substrate bonded to a second substrate through the adhesive composition. The first and second substrates of the article can be made from a variety of materials having a variety of properties. Useful substrates include rigid substrates (i.e., the substrate cannot be bent by an individual using two hands or will break if an attempt is made to bend the substrate with two hands), and flexible substrates (i.e., the substrate can be bent using the force of two hands and can return to its original shape after bending). Useful substrates include, e.g., polymer (e.g., polycarbonate, polyolefin (e.g., polypropylene, polyethylene, low density polyethylene, linear low density polyethylene, high density polyethylene, polypropylene, and oriented polypropylene, copolymers of polyolefins and other comonomers), polyether terephthalate, ethylene-vinyl acetate, ethylene-methacrylic acid ionomers, ethylene-vinyl-alcohols, polyesters, e.g. polyethylene terephthalate, polyamides (e.g. Nylon-6, Nylon-6,6, and Kevlar), polyvinyl chloride, polyvinylidene chloride, cellulosics, polystyrene, and epoxy), polymer composites (e.g., composites of a polymer and metal, cellulose, glass, a second polymer, and combinations thereof), metal (aluminum, copper, zinc, lead, gold, silver, platinum, and magnesium, metal alloys such as steel, stainless steel, tin, brass, and magnesium and aluminum alloys, and combinations thereof), carbon-fiber composites, other fiber-based composites, graphene, glass (e.g., alkali-aluminosilicate toughened glass and borosilicate glass), quartz, boron nitride, gallium nitride, sapphire, silicon carbide, ceramic, and combinations thereof.

The substrates can also include fillers, which can be in a variety of forms including, e.g., particles (spherical particles, beads, and elongated particles), fibers, and combinations thereof.

The substrates can be of a single material and a single layer or can include multiple layers of the same or different material. The layers can be continuous or discontinuous.

The substrates can be components of a variety of articles including, e.g., components of electronic devices (e.g., a camera, a cover, a frame, a housing (e.g., a housing of an electronic device), a circuit board-level assembly, a semiconductor assembly, a display of an electronic device (e.g., a glass panel, a touch sensitive screen, a touch insensitive screen, a liquid crystal display, and a polymer panel), a film, a conductive layer, a protective layer, an ink layer, and components of a light bulb (e.g., bulb, screw base, and LED housing).

The adhesive can be used in any of a variety of articles including, electronic devices (e.g., handheld electronic devices (e.g., phones (e.g., cellular telephones and cellular smartphones), cameras (e.g., cellular telephone cameras and housings for the same), tablets, electronic readers, monitors (e.g., monitors used in hospitals, and by healthcare workers, athletes and individuals), calculators, mice, touch pads, and joy sticks), wearable electronic devices (e.g., wrist watches and eyeglasses), computers e.g., desk top and lap top computers) computer monitors, televisions, media players, appliances (e.g., refrigerators, washing machines, dryers, ovens, and microwaves), light bulbs (e.g., incandescent, light emitting diode, and fluorescent), and combinations thereof.

The adhesive composition can be applied to a substrate using any suitable application method including, e.g., automatic fine line dispensing, dot dispensing (e.g., pneumatic, auger, jet, and ink jet dispensing) slot die coating, roll coating, gravure coating, transfer coating, pattern coating, screen printing, spray coating, filament coating, by extrusion, air knife, trailing blade, brushing, dipping, doctor blade, offset gravure coating, rotogravure coating, and combinations thereof. The adhesive composition can be applied as a continuous or discontinuous coating, in a single or multiple layers, and combinations thereof. The adhesive composition is also useful as an encapsulant.

The surface of the substrate on which the adhesive composition is to be applied optionally is surface treated to enhance adhesion prior to contact with the adhesive composition. Any suitable method for enhancing adhesion to the substrate surface including, e.g., corona treatments, chemical treatments, flame treatments, and combinations thereof.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient, temperature of from about 20° C. to about 25° C.) unless otherwise specified.

Test Sample Preparation Method

Each test specimen (100) is constructed from two clear polycarbonate plaques (102, 104) (25 mm in width, 75 mm in length, 2.9 mm in thickness), a spacer that consists of a single stainless steel wire (106) having a thickness of 75 microns (μm), and a small amount of the adhesive composition (108), as shown in FIG. 1, The plaques (102, 104) are cleaned with isopropyl alcohol. A very small amount of the adhesive composition (108) is dispensed on the second polycarbonate plaque (104) and then spread using a spatula to form a layer of wet adhesive. The 75 μm wire spacer is placed on the wet adhesive layer. The second plaque (104) is then positioned on the first plaque (102) such that the first plaque (102) and the second plaque (104) overlap (110) with each other 0.375 inch (9.53 mm) and the layer of adhesive composition (108) is centered in the overlap area (110). The plaques are then compressed together with metal spring clamps. The bond-line thickness is controlled to 75 μm by the stainless-steel wire spacer. Any excess adhesive that squeezes out during compression is removed using cotton swabs. The resulting construction is maintained at 70° C. in air for 30 minutes. Then the bonds are allowed to equilibrate at 25° C. and 40% relative humidity for four hours prior to testing.

Overlap Shear Test Method

The bond strength of a test sample is tested according to ASTM test method D1002 entitled, "Standard Test Method for Apparent Shear Strength of Single Lamp Joint Adhesively Bonded Metal Specimens by Tension Loading (Metal To Metal)," with the exception that the test samples are prepared according to the above Test Sample Preparation Method. The cross-head speed is 50 mm/min. The maximum load is reported in units of Newtons (N) and the shear strength is reported in megapascals (MPa). A minimum of 5 samples are tested to obtain a statistically significant result.

Die Shear Test Method

The die-shear strength of a test sample is measured using DAGE 4000Plus die-shear equipment. Test samples are prepared by drawing down a wet adhesive line that is from about 75 μm to 100 μm thick, 3 mm wide, and 75 mm long on a polycarbonate (PC) substrate having the dimensions 75 mm×25 mm×2.9 mm. A row of dies that are 3 mm×3 mm in dimension are placed on top of the wet adhesive line with even spacing between dies, and then a downward pressure is applied to the construction to completely wet the bottom surface of the dies. About 7 to 10 dies are placed along the adhesive line. The dies can be made from glass, alumina, metal, or polycarbonate (PC).

For UV curing, the test sample is irradiated with UV radiation at a wavelength sufficient to cure the composition (e.g., a UV light emitting diode that emits at 365 nm wavelength) through the two edges that are perpendicular to the axis of the adhesive line. For the examples disclosed herein, the UV LED source used was a Phoseon Fire Edge FE300.

For thermal curing, the test sample is exposed to a temperature sufficient to cure the composition. For the examples disclosed herein, the temperature used is specified in Table 3.

The die shear strength is reported in megapascals (MPa). A minimum of 5 samples are tested to obtain a statistically significant result.

Viscosity Test Method I

Viscosity is determined using a Brookfield viscometer Model DV2T and a CP-52 spindle at a shear rate of 20 sec$^{-1}$ at room temperature. The results are reported in centipoise (cP).

Viscosity Test Method II

Viscosity is determined using a Brookfield viscometer Model DV2T and a CP-52 spindle at a shear rate of 2 sec$^{-1}$ at room temperature. The results are reported in centipoise (cP).

Thixotropic Index Test Method

The thixotropic index for an adhesive composition is calculated by dividing the viscosity determined according to Viscosity Test Method II by the viscosity determined according to Viscosity Test Method I.

Glass Transition Test Method

The glass transition temperature (Tg) of an adhesive composition is determined by the peak temperature of the tangent delta (δ) curve from the Dynamic Mechanical Analysis test method using oscillatory mode at a frequency of 1 Hertz (Hz). The results are reported in ° C.

Coefficient of Thermal Expansion Test Method

The CTE α1 coefficient of thermal expansion is determined according to ASTM E831 at a temperature below the glass transition temperature of the cured adhesive composition and the results are reported in ppm/° C.

The CTE α2 coefficient of thermal expansion is determined according to ASTM E831 at a temperature above the glass transition temperature of the cured adhesive composition and the results are reported in ppm/° C.

Dynamic Scanning Calorimetry (DSC) Test Method

DSC is determined using a PerkinElmer PYRIS 1 DSC instrument running PYRIS SERIES—PYRIS 1 DSC software or equivalent. A 15 mg to 20 mg sample of the composition to be tested is measured in a DSC pan and the pan is placed to the left side of a reference pan.

For temperature ramp analysis, the sample is held for 2 minutes at the initial temperature of 45° C. and then the temperature is increased at a rate of 1° C./min to 250° C.

Dynamic Mechanical Analysis Test Method

Dynamic mechanical analysis (DMA) is conducted using a DMA Q800-2258 instrument and "Advantage for Q Series Version" software or equivalent. The instrument is set to DMA Multi-Frequency—Strain mode and Temp Ramp/Frequency Sweep.

Sample Preparation:

Two stacks of Teflon tapes measuring ¼ in.×4 in. are affixed to release liner sheets such that the two stacks are spaced about 0.5 in. apart. The thickness of the stack is about 500 μm. A 0.5 gram sample of the composition to be tested is drawn down in between the stacks using a blade. Another release liner sheet is then placed on the exposed sample composition such that the sample composition is sandwiched in between two release liner sheets. The edges are then sealed using tape. The sample composition is then cured. Once the cure is complete, the sheet is cut open and the rectangular-shaped, cured sample composition is removed from the release liner sheet.

The sample is then placed in tension mode in the DMA instrument at a preload force of 0.01 N. The test sample is equilibrated at −50° C., is held at −50° C. for 5 minutes (min) and then the temperature is increased to a final temperature of 250° C. at a temperature ramp rate of 5° C./min and a frequency of 1.00 Hz.

Linear Shrinkage Test Method

Linear shrinkage is determined using a Thermal Mechanical Analysis (TMA) instrument. A sample of the uncured liquid adhesive composition is placed between two dies. The thickness (i.e., height) of the sample is monitored using a TMA probe. A sample of adhesive composition is pre-heated to 40° C. for a period of time sufficient for the composition to flow and fully wet out the dies. The thickness (i.e., height of the gap) of the wetted out adhesive composition is measured and recorded as the Initial gap. The adhesive composition is then cured at 80° C. by holding the composition at 80° C. for one hour. The height of the gap is measured during the one hour period. The thickness (i.e., height of the gap) of the adhesive composition after one hour is measured and recorded as the Final gap. The percentage linear shrinkage is calculated according to the following equation:

% shrinkage=[[(Initial gap)−(Final gap)]/(Initial gap)]×100 and recorded in units of percent.

Examples E1-E3

The adhesive compositions of Examples E1-E3 were prepared by sequentially combining the components set forth in Table 1 at room temperature by first hand mixing the component into the composition and then speed mixing the component into the composition. The combining and mixing were performed at room temperature. The speed mixing was repeated if a component was not completely incorporated into the composition. The speed mixing included mixing at 800 rotations per minute (rpm) for 10 seconds (s), followed by from 1100 rpm to 1800 rpm for from 60 s to 120 s, which was then followed by 800 rpm for 10 s. The maximum speed used for mixing the PERKADOX 16 into the composition was 1100 rpm.

The components (where present in the composition) were combined in the following order: SR423A, SR285, SR611, ARONIX M9050, OMNIRAD 73, OMNIRAD TPO, SR833S, PERKADOX 16, PEAM 645, RAVEN 410, SFP-30M, and AEROSIL R202. After the addition of each of RAVEN 410, SFP-30M, and AEROSIL R202 cylindrical ceramic stirring beads were added to the mixture to aid in mixing each component into the composition.

TABLE 1

| Example | E1 | E2 | E3 |
| --- | --- | --- | --- |
| PEAM 645 | 26 | 20.58 | 25.68 |
| ARONIX M9050 | 3 | 0 | 0 |
| SR285 | 3 | 0 | 0 |
| SR611 | 2.5 | 0 | 0 |
| SR423A | 7 | 24.44 | 14.13 |
| SR833S | 12 | 16.02 | 12.84 |
| SFP-30M | 40 | 30.49 | 37.07 |
| PERKADOX 16 | 5 | 3.81 | 4.75 |
| AEROSIL R 202 | 1.5 | 4.66 | 2.88 |
| OMNIRAD 73 | 0 | 0 | 2.0 |

TABLE 1-continued

| Example | E1 | E2 | E3 |
| --- | --- | --- | --- |
| OMNIRAD TPO | 0 | 0 | 0.5 |
| RAVEN 410 | 0 | 0 | 0.15 |

PEAM 645 polyester acrylate/methacrylate hybrid oligomer from Designer Molecules, Inc. (San Diego, California).
ARONIX M9050 multifunctional polyester acrylate (Toagosei Co. Ltd? Japan)
SR285 = SARTOMER SR285 tetrahydrofurfuryl acrylate from Arkema Inc. (Exton, Pennsylvania)
SR611 = SARTOMER SR611 alkoxylated tetrahydrofurfuryl acrylate (Arkema Inc.)
SR423A = SARTOMER SR423A isobornyl acrylate (Arkema Inc.)
SR833S= SARTOMER SR833S tricyclodecane dimethanol diacrylate (Arkema Inc.)
SFP-30M = fused silica
PERKADOX 16 = di(4-tert-butylcyclohexyl) peroxydicarbonate (Akzo Nobel)
AEROSIL R 202 = fumed silica (Evonik Corp., Parsippany, New Jersey)
OMNIRAD 73 = 2-hydroxy-2-methyl-l-phenylpropanone (IGM Resins USA Inc., Charlotte, North Carolina)
OMNIRAD TPO = diphenyl (2,4,6-trimethylbenzoyl) phosphine oxide (IGM Resins USA Inc., Charlotte, North Carolina)
RAVEN 410 = carbon black Examples E4-E7 and Controls C1 and C2

The adhesive compositions of Examples E4-E7 and Controls C1 and C2 were prepared by sequentially combining the components set forth in Table 2 below by first hand mixing the component into the composition and then speed mixing the component into the composition. The combining and mixing were performed at room temperature. The speed mixing was repeated if a component was not completely incorporated into the composition. The speed mixing included mixing at 800 rotations per minute (rpm) for 10 seconds (s), followed by from 1100 rpm to 1800 rpm for from 60 s to 120 s, which was then followed by 800 rpm for 10 s. The maximum speed used for mixing the PERKADOX 16 into the composition was 1100 rpm.

The components (where present in the composition) were combined in the following order: hydroquinone, A-675, SR611, OMNIRAD 73, OMNIRAD TPO, SR423A, SR833S, SILQUEST A187, PERKADOX 16, PERM 645, RAVEN 410, SEP-30M, and AEROSIL R202. After the addition of each of RAVEN 410, SEP-30M, and AEROSIL R202 cylindrical ceramic stirring heads were added to the mixture to aid in mixing each component into the composition.

TABLE 2

| Example | E4 | C1 | E5 | C2 | E6 | E7 |
| --- | --- | --- | --- | --- | --- | --- |
| PEAM 645 | 11.14 | 23.60 | 28.8 | 25.93 | 40.89 | 25.94 |
| SR611 | 0 | 23.64 | 9.4 | 25.93 | 10.22 | 0 |
| SR423A | 40.58 | 0 | 0 | 0 | 0 | 0 |
| SR833S | 14.81 | 0 | 9.4 | 0 | 0 | 25.94 |
| STP-30M | 13.98 | 40.52 | 40 | 40 | 40.60 | 39.16 |
| PERKADOX 16 | 4.49 | 3.02 | 4 | 3 | 3.01 | 3.92 |
| AEROSIL R 202 | 12.51 | 6.98 | 5.4 | 3 | 2.00 | 2.94 |
| OMNIRAD 73 | 2.00 | 0 | 0 | 0 | 0 | 0 |
| OMNIRAD TPO | 0.5 | 2.09 | 2 | 2 | 2.00 | 1.96 |
| RAVEN 410 | 0 | 0.15 | 0 | 0.15 | 0.25 | 0.15 |
| SILQUEST A187 | 0 | 0 | 0.5 | 0 | 1.00 | 0 |
| A-675-100% | 0 | 0 | 0.5 | 0 | 0 | 0 |
| Hydroquinone | 0 | 0 | 0 | 0 | 0.02 | 0 |

SILQUEST A187 = alkoxy silane epoxy adhesion promoter (Momentive Performance Materials Inc., Waterford, New York)
A-675-100% = pyromellitic dianhydride glycerol dimethacrylate adduct (PMDGM) from Designer Molecules Inc. (San Diego, California)

Figure 2:
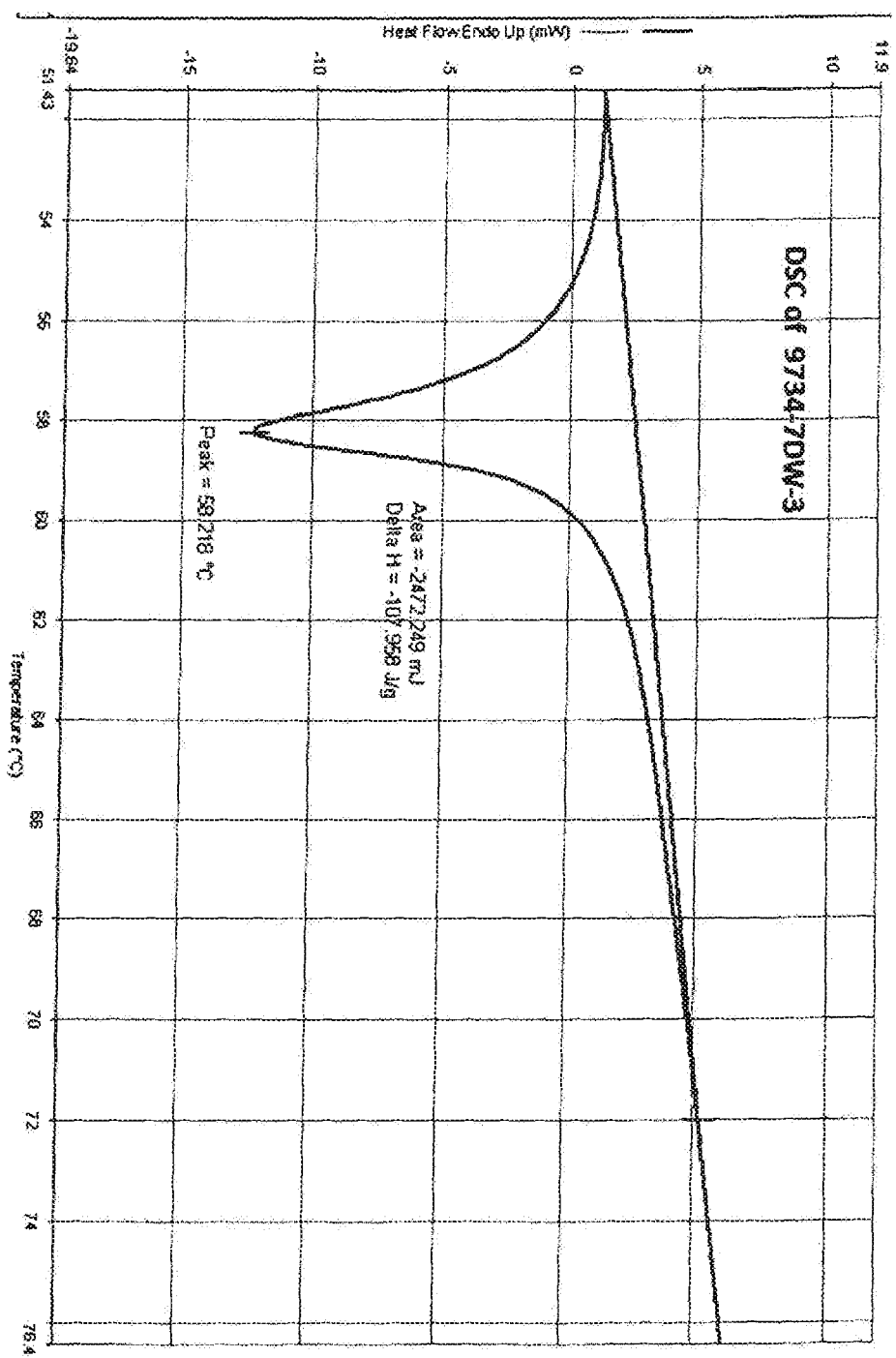
FIG. 2 is a Differential Scanning calorimetry plot of the adhesive composition of Example E2.
Figure 3:
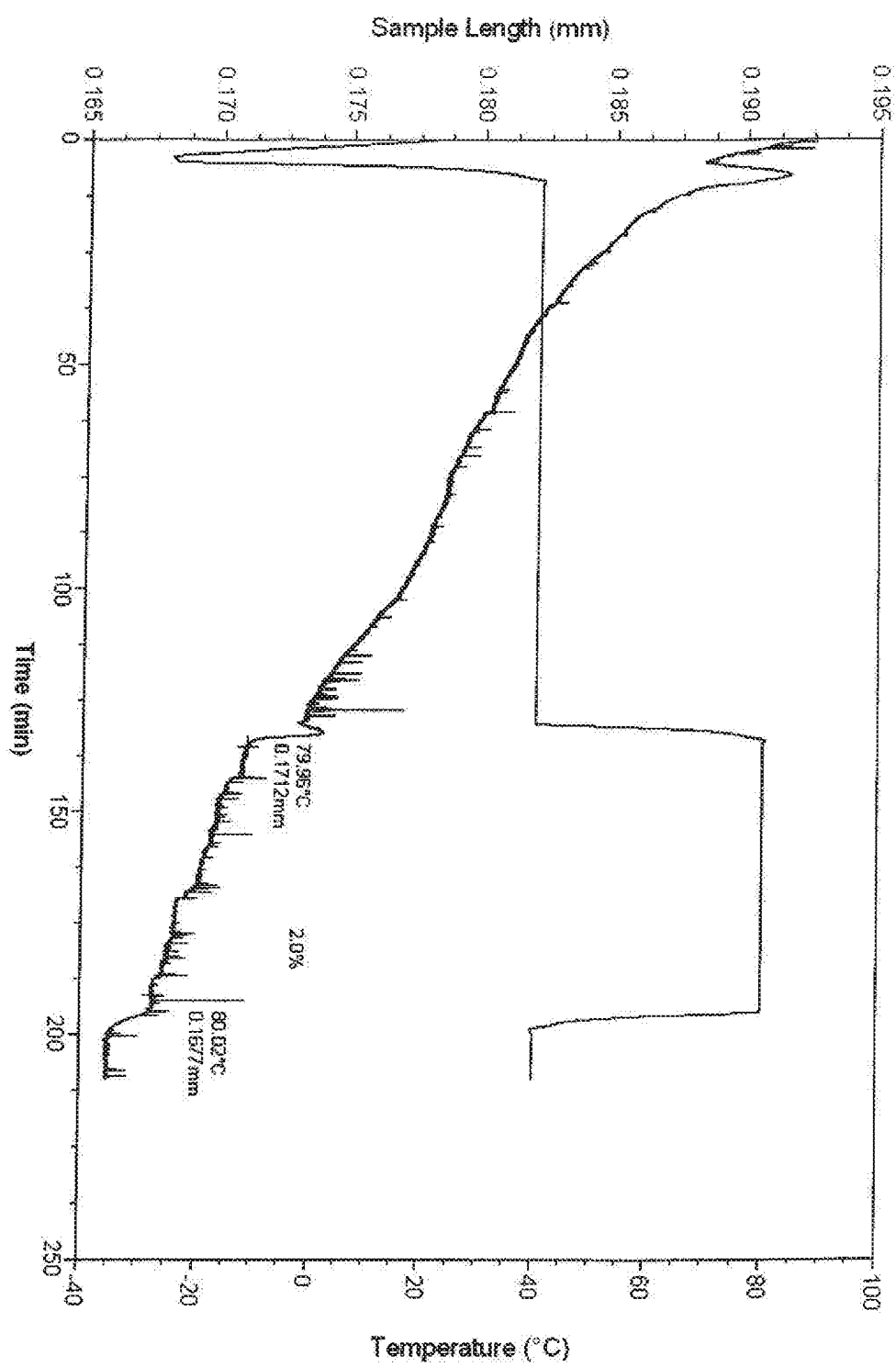
FIG. 3 is a Thermomechanical Analysis plot of the adhesive composition of Example E5.
Figure 4:
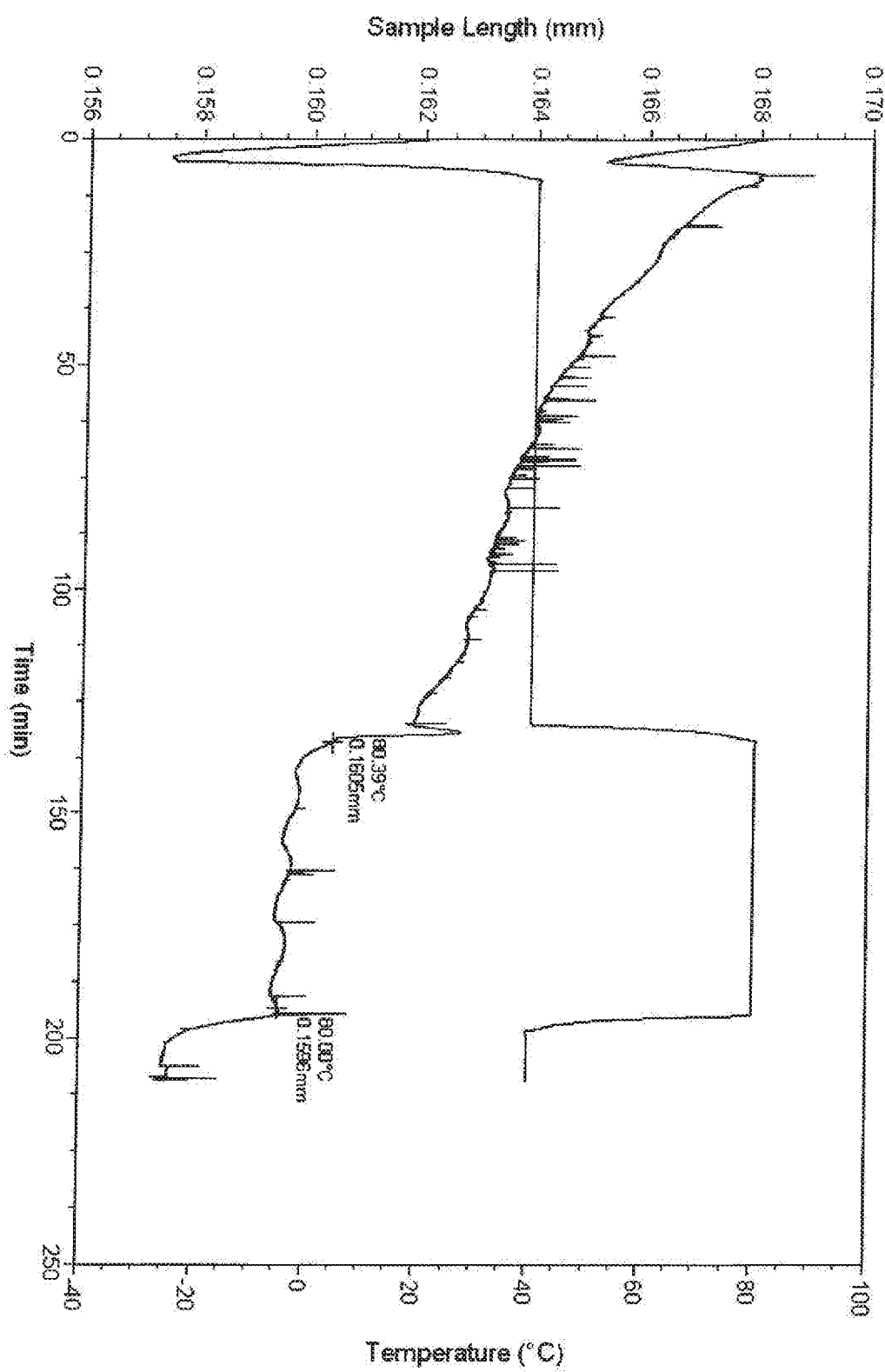
FIG. 4 is a Thermomechanical Analysis plot of the adhesive composition of Example E6.

The adhesive compositions of Examples E3-E7 and Controls C1 and C2 were tested according to the Viscosity I, CTE, Glass Transition, Die Shear, and Overlap Shear test methods and the results are reported in Table 3. The Die Shear test method was conducted on one set of samples in which the substrate was polycarbonate (PC) and the dies were polycarbonate and another set of samples in which the substrate was polycarbonate and the dies were alumina. The adhesive composition of Example E2 was tested according to the DSC test method and the results are illustrated in FIG. 2. The adhesive compositions of E5 and E6 were tested according to the Linear Shrinkage test method and the TMA plots of the same are set forth in FIGS. 3 and 4, respectively, where the y axis on the left hand side of the plot reflects the height of the gap in millimeters they axis on the right hand side of the plot reflects the temperature in degrees Celsius (° C.), and the x axis represents elapsed time in minutes.

Examples E8 and E9

The adhesive compositions of Examples E8 and E9 were prepared according to the method described above for Examples E4-E7 using the components set forth in Table 4 below. The components (where present in the composition) were combined in the following order: A-675, SR611, OMNIRAD TPO, SR506A, SR833S, SILQUEST A187, PERKADOX 16, CN981, HYPRO 2000X168 VTB LC, PEAM 645, SFP-30M, and AEROSIL R202. After the addition of each of SFP-30M and AEROSIL R202 cylindrical ceramic stirring beads were added to the mixture to aid in mixing each component into the composition.

TABLE 3

| Example | E3 | E4 | C1 | E5 | C2 | E6 | E7 |
|---|---|---|---|---|---|---|---|
| Viscosity @ 25 ° C. and 20 sec$^{-1}$ | 12,000 | 17,800 | 64,000 | 37,660 | 13,000 | 37,000 | ND |
| Thixotropic Index | 3.6 | 7.1 | 5.6 | ND | 8.1 | 5.2 | ND |
| Cure condition | 70° C. for 15 min | 70° C. for 15 min | 70° C. for 15 min | 60° C. for 3 hrs | 70° C. for 15 min | 80° C. for 15 min | 70° C. for 15 min |
| Tg (° C.) | 150 | 146 | 41 | 90 | 41 | 88 | 145 |
| CTE α1 (ppm/° C.) | 41 | 55 | 67 | 41 | 71 | 52 | ND |
| CTE α2 (ppm/° C.) | 124 | 154 | 149 | 124 | 153 | 137 | ND |
| Die Shear Strength at 25° C. (PC to PC) (MPa) | ND | ND | ND | 11.1 | ND | 11.4 | ND |
| Die Shear Strength at 25° C. (Alumina to PC) (MPa) | 1.3 | ND | ND | ND | 14.7 | 25.8 | ND |
| Overlap Shear Adhesion Strength (PC to PC) (MPa) | 6.5 | 4.3 | 11.7 | 4.9 | ND | 8.3 | 8.3 |
| % Linear Shrinkage | ND | ND | ND | 2.0 | ND | 0.6 | ND |

ND = Not Determined.

TABLE 4

| Example | E8 | E9 |
|---|---|---|
| SR506A | 8.90 | 8.90 |
| CN981 | 17.81 | 0 |
| HYPRO 2000X168 VTB LC | 0 | 17.81 |
| SR833S | 9.73 | 9.73 |
| PEAM 645 | 12.80 | 12.80 |
| SR611 | 4.18 | 4.18 |
| PERKADOX 16 | 3.56 | 3.56 |
| SILQUEST A187 | 0.44 | 0.44 |
| A-675-100% | 0.44 | 0.44 |
| OMNIRAD TPO-L | 1.78 | 1.78 |
| SFP 30M | 35.56 | 35.56 |
| AEROSIL R 202 | 4.80 | 4.80 |
| Total | 100.00 | 100.00 |

SR506A = isobornyl acrylate (Arkema)
CN981 = aliphatic polyester/polyether urethane diacryiate oligomer (Arkema)
HYPRO 2000X168 VTB LC = methacrylate terminated butadiene homopolymer (CVC Thermoset Specialties, Moorestown, New Jersey)
OMNIRAD TPO-L = liquid 2,4,6-trimethylbenzoylphenyl phosphinate (IGM Resins USA Inc., Charlotte, North Carolina)

Other embodiments are within the claims. All references referred to herein are incorporated herein to the extent they do not conflict.

1. A one part curable adhesive composition comprising at least 10% by weight, based on the total weight of polymerizable components, of a multifunctional (meth)acrylate oligomer the homopolymer of which has a Tg of at least 100° C., and at least 5% by weight, based on the total weight of polymerizable components, of a first (meth)acrylate monomer the homopolymer of which has a Tg of at least 100° C., the first (meth)acrylate monomer exhibiting a viscosity of no greater than 1000 centipoise (cP) at 25° C., the curable adhesive composition exhibiting a viscosity of no greater than 100,000 cP when measured at 25° C. and a shear rate of 20 sec$^{-1}$, the adhesive composition, when cured, exhibiting a Tg of at least 120° C.

2. A one part curable adhesive composition comprising at least about 20% by weight, based on the total weight of polymerizable components, of a multifunctional (meth)acrylate oligomer the homopolymer of which has a Tg of at least 100° C., and from 4% by weight to no greater than 25% by weight, based on the total weight of polymerizable components, alkoxylated tetrahydrofurfuryl (meth)acrylate, the curable adhesive composition exhibiting a viscosity of no greater than 100,000 cP when measured at 25° C. and a shear rate of 20 sec$^{-1}$.

3. The curable adhesive composition of paragraph 2 further comprising at least 5% by weight, based on the total weight of polymerizable components, of a first (meth)acrylate monomer the homopolymer of which has a Tg of at least 100° C., the first (meth)acrylate monomer exhibiting a viscosity of no greater than 1000 centipoise (cP) at 25° C.

4. The curable adhesive composition of paragraphs 1-3 further comprising at least 30% by weight of a nonconductive filler.

5. The curable adhesive composition of any one of paragraphs 1-4 further comprising from about 30% by weight to about 90% by weight filler.

6. The curable adhesive composition of any one of paragraphs 1-5, wherein the filler comprises fumed silica.

7. The curable adhesive composition of any one of paragraphs 1-6 further comprising a silane adhesion promoter.

8. The curable adhesive composition of any one of paragraphs 1-7 further comprising a thermal initiator, a photo initiator, or a combination thereof.

9. The curable adhesive composition of any one of paragraphs 1-8 further comprising a thermal initiator and a photo initiator.

10. The curable adhesive composition of any one of paragraphs 1-9, wherein the homopolymer of the multifunctional (meth)acrylate oligomer exhibits a glass transition temperature of at least 120° C.

11. The curable adhesive composition of any one of paragraphs 1-9, wherein the homopolymer of the multifunctional (meth)acrylate oligomer exhibits a glass transition temperature of at least 140° C.

12. The curable adhesive composition of any one of paragraphs 1-11 further comprising a monoethylenically unsaturated (meth)acrylate monomer exhibiting a viscosity of no greater than 100 centipoise (eP) at 25° C.

13. The curable adhesive composition of any one of paragraphs 1-12 comprising at least 5% by weight, based on the total weight of polymerizable components, of the monoethylenically unsaturated (meth)acrylate monomer.

14. The curable adhesive composition of any one of paragraphs 1 and 4-13 further comprising tetrahydrofurfuryl acrylate, alkoxylated tetrahydrofurfuryl acrylate, or a combination thereof.

15. The curable adhesive composition of any one of paragraphs 1-13 comprising at least 5% by weight, or even at least 10% by weight, based on the total weight of polymerizable components, tetrahydrofurfuryl acrylate, alkoxylated tetrahydrofurfuryl acrylate, or a combination thereof.

16. The curable adhesive composition of any one of paragraphs 1-15 further comprising a second (meth)acrylate monomer different from the first (meth)acrylate monomer, the second (meth)acrylate monomer being multifunctional and comprising polyester (meth)acrylate.

17. The curable adhesive composition of paragraph 16, wherein the homopolymer of the second (meth)acrylate monomer exhibits a Tg of at least 200° C.

18. The curable adhesive composition of any one of paragraphs 16 and 17, wherein the second (meth)acrylate monomer comprises at least three ethylenically unsaturated functional groups.

19. The curable adhesive composition of any one of paragraphs 1 and 3-18 comprising at least 17% by weight, based on the total weight of polymerizable components, of the multifunctional (meth)acrylate oligomer, and at least 10% by weight, based on the total weight of polymerizable components, of the first (meth)acrylate monomer.

20. The curable adhesive composition of any one of paragraphs 1 and 3-18 comprising from at least 20% by weight, based on the total weight of polymerizable components, to no greater than 45% by weight, based on the total weight of polymerizable components, of the multifunctional (meth)acrylate oligomer, and from at least 10% by weight, based on the total weight of polymerizable components, to no greater than 55% by weight, based on the total weight of polymerizable components, of the first (meth)acrylate monomer.

21. The curable adhesive composition of any one of paragraphs 1-20, wherein the composition, when cured, exhibits a Tg of at least 150° C.

22. The curable adhesive composition of any one of paragraphs 1-11, wherein the composition, when cured at a temperature of no greater than 60° C., exhibits a Tg of at least 150° C.

23. The curable adhesive composition of any one of paragraphs 1-22, wherein the composition, when cured, exhibits a coefficient of thermal expansion of no greater than 75 parts per million per degree centigrade (ppm/° C.).

24. An electronic article comprising a first substrate, an adhesive composition, and a component adhered to the first substrate through the adhesive composition, the adhesive composition comprising a cured form of the curable adhesive composition of any one of paragraphs 1-23.

25. The electronic article of paragraph 24, wherein the first substrate comprises polycarbonate, alumina, glass, metal or a combination thereof.

26. A method of using the one part adhesive composition of any one of paragraphs 1-23, the method comprising heating the one part thermally curable adhesive composition to a temperature of no greater than 80° C. to form a cured composition having a Tg of at least 85° C.

27. The method of paragraph 26, wherein the cured composition exhibits a Tg greater than 100° C.

28. The method of paragraph 26, wherein the cured composition exhibits a Tg of at least 120° C.

29. The method of paragraph 26, wherein the cured composition exhibits a Tg of at least 140° C.

30. The method of paragraph 26 wherein said heating comprises heating the thermally curable adhesive composition to a temperature of no greater than 70° C.

31. The method of any one of paragraphs 26-29, wherein the heating comprises heating the thermally curable adhesive composition to a temperature of no greater than 60° C.

32. The method of any one of paragraphs 26-31 further comprising exposing the thermally curable adhesive composition to electron radiation, ultraviolet radiation, visible light, or a combination thereof.

33. The method of any one of paragraphs 26-32, wherein the thermally curable adhesive composition further includes a thermal initiator and a photo initiator.

34. The method of any one of paragraphs 1-33 further comprising applying the thermally curable adhesive composition to a component of an electronic article, and exposing the thermally curable adhesive composition to electron radiation, ultraviolet radiation, visible light, or a combination thereof, prior to heating the thermally curable adhesive composition.

What is claimed is:

1. A one part curable adhesive composition comprising:
   at least 10% by weight, based on the total weight of polymerizable components, of a multifunctional (meth)acrylate oligomer the homopolymer of which has a glass transition temperature (Tg) of at least 100° C.;
   at least 5% by weight, based on the total weight of polymerizable components, of a first (meth)acrylate monomer the homopolymer of which has a Tg of at least 100° C., the first (meth)acrylate monomer exhibiting a viscosity of no greater than 1000 centipoise (cP) at 25° C.; and
   alkoxy tetrahydrofurfuryl (meth)acrylate,
   the curable adhesive composition exhibiting a viscosity of no greater than 100,000 cP when measured at 25° C. and a shear rate of 20 sec$^{-1}$.

2. The curable adhesive composition of claim 1 further comprising a second (meth)acrylate monomer the homopolymer of which exhibits a Tg of at least 200° C., the second (meth)acrylate monomer being multifunctional and being different from the first (meth)acrylate monomer.

3. The curable adhesive composition of claim 2, wherein the second (meth)acrylate monomer comprises at least three ethylenically unsaturated functional groups.

4. The curable adhesive composition of claim 1, wherein the composition, when cured, exhibits a Tg of at least 150° C.

5. The curable adhesive composition of claim 1, wherein the composition, when cured, exhibits a coefficient of thermal expansion of no greater than 75 parts per million per degree centigrade (ppm/° C.).

6. The curable adhesive composition of claim 1 comprising
at least 17% by weight, based on the total weight of polymerizable components, of the multifunctional (meth)acrylate oligomer; and
at least 10% by weight, based on the total weight of polymerizable components, of the first (meth)acrylate monomer.

7. The curable adhesive composition of claim 1 comprising
from at least 20% by weight, based on the total weight of polymerizable components, to no greater than 45% by weight, based on the total weight of polymerizable components, of the multifunctional (meth)acrylate oligomer; and
from at least 10% by weight, based on the total weight of polymerizable components, to no greater than 55% by weight, based on the total weight of polymerizable components, of the first (meth)acrylate monomer.

8. The curable adhesive composition of claim 1, wherein the homopolymer of the multifunctional (meth)acrylate oligomer exhibits a glass transition temperature of at least 120° C.

9. The curable adhesive composition of claim 1, wherein the homopolymer of the multifunctional (meth)acrylate oligomer exhibits a glass transition temperature of at least 140° C.

10. The curable adhesive composition of claim 1 further comprising a monoethylenically unsaturated (meth)acrylate monomer exhibiting a viscosity of no greater than 100 centipoise (cP) at 25° C.

11. The curable adhesive composition of claim 1 comprising at least 5% by weight, based on the total weight of polymerizable components, alkoxy tetrahydrofurfuryl (meth)acrylate.

12. The curable composition of claim 1 further comprising at least 30% by weight of a nonconductive filler.

13. The curable adhesive composition of claim 1 further comprising a silane adhesion promoter.

14. A one part curable adhesive composition comprising:
at least 10% by weight, based on the total weight of polymerizable components, of a multifunctional (meth) acrylate oligomer the homopolymer of which has a glass transition temperature (Tg) of at least 100° C.; and
at least 5% by weight, based on the total weight of polymerizable components, of a first (meth)acrylate monomer the homopolymer of which has a Tg of at least 100° C., the first (meth)acrylate monomer exhibiting a viscosity of no greater than 1000 centipoise (cP) at 25° C.,
the curable adhesive composition exhibiting a viscosity of no greater than 100,000 cP when measured at 25° C. and a shear rate of 20 sec$^{-1}$,
the adhesive composition, when cured, exhibiting a Tg of at least 120° C.

15. The curable adhesive composition of claim 14 further comprising a second (meth)acrylate monomer the homopolymer of which exhibits a Tg of at least 200° C., the second (meth)acrylate monomer being multifunctional and being different from the first (meth)acrylate monomer.

16. The curable adhesive composition of claim 15, wherein the second (meth)acrylate monomer comprises at least three ethylenically unsaturated functional groups.

17. The curable adhesive composition of claim 14 further comprising tetrahydrofurfuryl acrylate, alkoxy tetrahydrofurfuryl acrylate, or a combination thereof.

18. An electronic article comprising:
a first substrate;
an adhesive composition; and
a component adhered to the first substrate through the adhesive composition, the adhesive composition comprising a cured form of the curable adhesive composition of claim 1.

19. The electronic article of claim 18, wherein the first substrate comprises polycarbonate, alumina, glass, metal or a combination thereof.

20. A method of using a one part adhesive composition, the method comprising:
applying the adhesive composition of claim 1 to a component of an electronic article;
exposing the adhesive composition to visible light, electron beam radiation, ultraviolet radiation, or a combination thereof,
heating the adhesive composition; and
allowing the heated composition to cure,
the cured composition exhibiting a Tg greater than 85° C.

* * * * *